(12) United States Patent
Jhang et al.

(10) Patent No.: US 10,057,851 B2
(45) Date of Patent: Aug. 21, 2018

(54) WIRELESS COMMUNICATION METHOD AND DEVICE

(71) Applicant: MediaTek Inc., Hsin-Chu (TW)

(72) Inventors: Ming-Fong Jhang, Zhubei (TW); Jia-Shi Lin, Fangyuan Township, Changhua County (TW)

(73) Assignee: MEDIATEK INC., Hsin-Chu (TW)

( * ) Notice: Subject to any disclaimer, the term of this patent is extended or adjusted under 35 U.S.C. 154(b) by 29 days.

(21) Appl. No.: 14/989,119

(22) Filed: Jan. 6, 2016

(65) Prior Publication Data

US 2016/0198408 A1 Jul. 7, 2016

Related U.S. Application Data

(60) Provisional application No. 62/100,161, filed on Jan. 6, 2015.

(51) Int. Cl.
*H04W 52/02* (2009.01)
*H04L 1/18* (2006.01)
*H04W 76/28* (2018.01)

(52) U.S. Cl.
CPC ....... *H04W 52/0225* (2013.01); *H04L 1/1812* (2013.01); *H04W 76/28* (2018.02); *Y02D 70/00* (2018.01); *Y02D 70/1224* (2018.01); *Y02D 70/1226* (2018.01); *Y02D 70/1242* (2018.01); *Y02D 70/1262* (2018.01); *Y02D 70/24* (2018.01)

(58) Field of Classification Search
CPC ........... H04W 52/0225; H04W 76/048; H04W 76/28; H04L 1/1812; Y02B 60/50; Y02D 70/00; Y02D 70/1226; Y02D 70/1224; Y02D 70/24; Y02D 70/1262; Y02D 70/1242
USPC ................ 370/252, 311, 328, 329, 330, 336
See application file for complete search history.

(56) References Cited

U.S. PATENT DOCUMENTS

| | | | | |
|---|---|---|---|---|
| 2009/0016252 A1* | 1/2009 | Ho | ..................... | H04W 52/0283 370/311 |
| 2011/0176466 A1* | 7/2011 | Lindoff | ............ | H04W 52/0225 370/311 |
| 2013/0301508 A1* | 11/2013 | Almog | .............. | H04W 52/0229 370/311 |
| 2014/0254444 A1* | 9/2014 | Kim | .................. | H04W 52/0225 370/311 |
| 2015/0282125 A1* | 10/2015 | Lee | ........................ | H04L 1/1812 370/329 |
| 2015/0359034 A1* | 12/2015 | Kim | .................... | H04W 76/048 370/328 |

* cited by examiner

*Primary Examiner* — Walli Butt
(74) *Attorney, Agent, or Firm* — Oblon, McClelland, Maier & Neustadt, L.L.P.

(57) ABSTRACT

A wireless communication method and device are provided. The wireless communication method includes the steps of activating a power-saving mechanism by user equipment (UE) to stop monitoring a Physical Downlink Control Channel (PDCCH) when a network does not enable a Discontinuous Reception (DRX) mechanism to configure the UE to switch to a DRX mode or when the network disables the DRX mechanism.

18 Claims, 6 Drawing Sheets

WIRELESS COMMUNICATION METHOD AND DEVICE

CROSS REFERENCE TO RELATED APPLICATIONS

This application claims priority of U.S. Provisional Patent Application No. 62/100,161, filed on Jan. 6, 2015, the entirety of which is incorporated by reference herein.

BACKGROUND OF THE INVENTION

Field of the Invention

The invention generally relates to a wireless communication technology, and more particularly, to a wireless communication method for activating a power-saving mechanism to stop monitoring a Physical Downlink Control Channel (PDCCH) when a Discontinuous Reception (DRX) mechanism is not configured or enabled by the network.

Description of the Related Art

Wireless communication systems have been used widely to provide various telecommunication services such as telephony, video, data, messaging, and broadcast services. Typical wireless communication systems may employ multiple-access technologies capable of supporting communication with multiple users by sharing available system resources (e.g., bandwidth, transmission power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by the Third Generation Partnership Project (3GPP). It is designed to better support mobile broadband Internet access by improving spectral efficiency, lowering costs, improving services, making use of new spectrums, and integrating better with other open standards using OFDMA on downlinks (DL), and SC-FDMA on uplinks (UL) and multiple-input multiple-output (MIMO) antenna technology.

Figure 1:
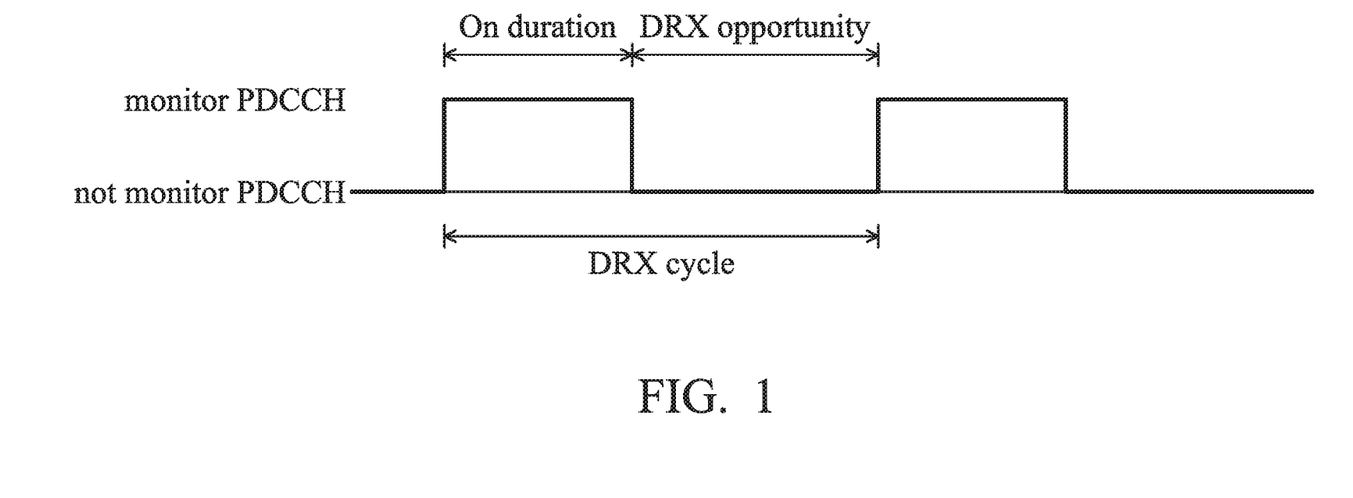
FIG. 1 is a schematic diagram illustrating a conventional DRX cycle.

In an LTE system, user equipment (UE) needs to monitor a physical downlink control channel (PDCCH) to determine whether there is DL data transmitted form the network. However, the UE's monitoring of the PDCCH will consume battery power, and this power is wasted when the time slots have no control signaling for the UE. In LTE technology, a Discontinuous Reception (DRX) mechanism is defined to reduce monitoring power. FIG. 1 is a schematic diagram illustrating a conventional DRX cycle. As shown in FIG. 1 the DRX cycle comprises two parts: "On duration" and "DRX opportunity". In On duration, the UE may still monitor the PDCCH. In the DRX opportunity, the UE will stop monitoring the PDCCH to save power.

However, in some networks, these networks may not configure DRX for UE. Therefore, the UE may still monitor the PDCCH when no data has been transmitted from the network for a long time, and as a result, the power of the UE will be wasted.

BRIEF SUMMARY OF THE INVENTION

A wireless communication method and device are provided to overcome the problems mentioned above.

An embodiment of the invention provides a wireless communication method. The wireless communication method comprises the steps of activating a power-saving mechanism by user equipment (UE) to stop monitoring a Physical Downlink Control Channel (PDCCH) when a network does not enable a Discontinuous Reception (DRX) mechanism to configure the UE to switch to a DRX mode or when the network disables the DRX mechanism.

In some embodiments of the invention, the power-saving mechanism may comprise the steps of monitoring the PDCCH for a first period; and stopping monitoring the PDCCH for a second period when there is no down link (DL) assignment during the first period. In some embodiments of the invention, the wireless communication method may further comprise the step of extending the first period for a protection period from a reception time point of the DL assignment in the first period, when the DL assignment is received during the first period. In some embodiments of the invention, the wireless communication method may further comprise the step of determining whether a predictable DL data will be transmitted to the UE according to a previous measured timing advance (TA) command period, a measurement report triggered by the UE, or a determination for the UE which is inactive for a period of time; and stopping the power-saving mechanism when determining the predictable DL data will be transmitted to the UE.

An embodiment of the invention provides a wireless communication device. The wireless communication device comprises a processor. The processor is configured to activate a power-saving mechanism to stop monitoring a Physical Downlink Control Channel (PDCCH) when a network does not enable a Discontinuous Reception (DRX) mechanism to configure the wireless communication device to switch to a DRX mode or when the network disables the DRX mechanism.

In some embodiments of the invention, in the power-saving mechanism, the processor monitors the PDCCH for a first period and stops monitoring the PDCCH for a second period when there is no down link (DL) assignment during the first period. In some embodiments of the invention, the processor further extends the first period for a protection period from a reception time point of the DL assignment in the first period, when the DL assignment is received during the first period. In some embodiments of the invention, the processor further determines whether a predictable DL data will be transmitted to the UE according to a previous measured timing advance (TA) command period, a measurement report triggered by the UE, or a determination for the UE which is inactive for a period of time. When the processor determines the predictable DL data will be transmitted to the UE, the processor stops the power-saving mechanism.

Other aspects and features of the invention will become apparent to those with ordinary skill in the art upon review of the following descriptions of specific embodiments of wireless communication methods and devices.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2:
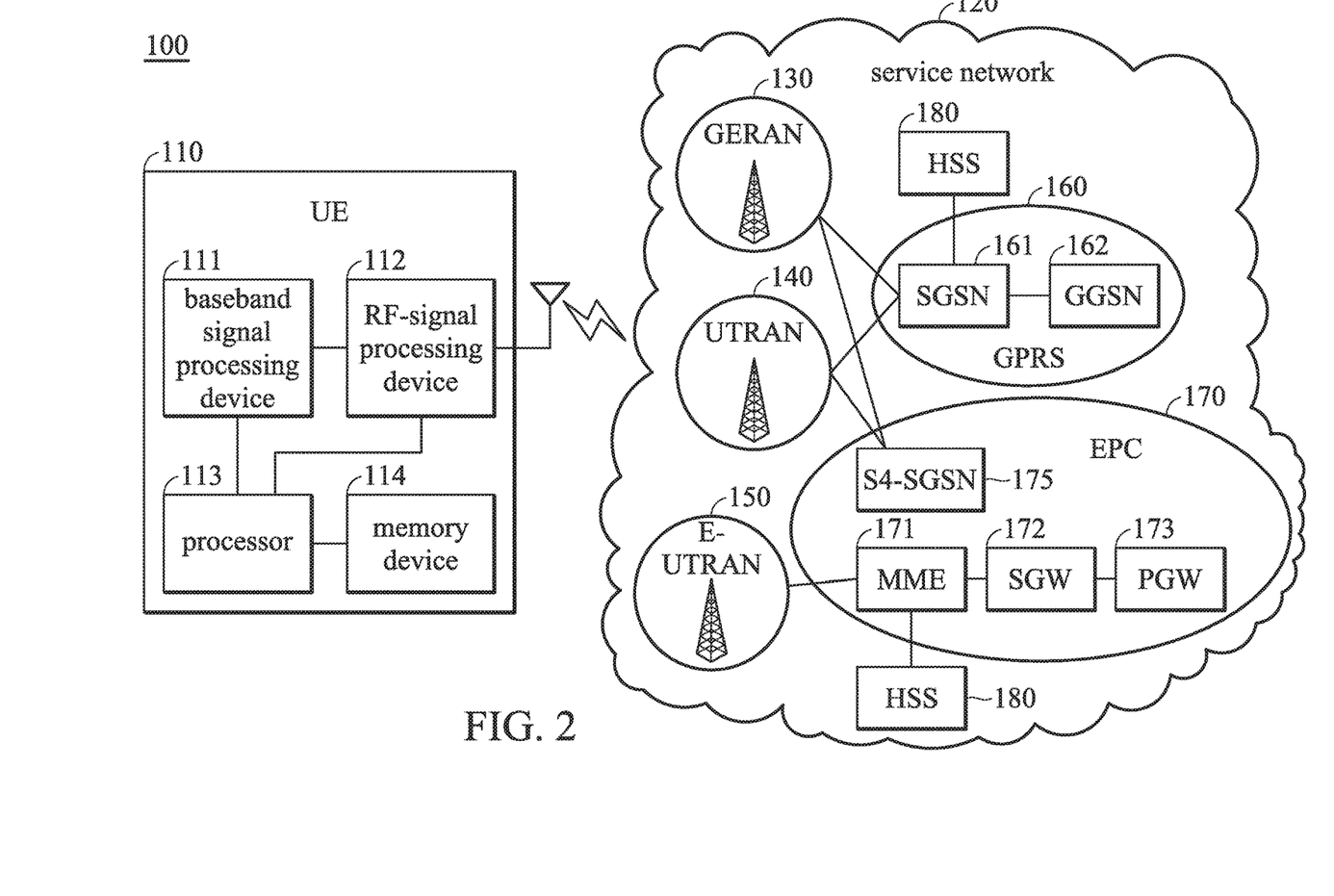
FIG. 2 is a block diagram of a mobile communications system 100 according to an embodiment of the invention.

FIG. 2 is a block diagram of a mobile communications system 100 according to an embodiment of the invention. The system 100 comprises User Equipment (UE) 110 and a service network 120. The UE 110 may be a mobile communications device, such as a cellular phone, a smartphone modem processor, a data card, a laptop stick, a mobile hotspot, a USB modem, a tablet, etc.

The UE 110 may comprise at least a baseband signal processing device 111, a radio frequency (RF) signal processing device 112, a processor 113, a memory device 114, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 2.

The RF signal processing device 112 may receive RF signals via the antenna and process the received RF signals to convert the received RF signals to baseband signals to be processed by the baseband signal processing device 111, or receive baseband signals from the baseband signal processing device 111 and convert the received baseband signals to RF signals to be transmitted to a peer communications apparatus. The RF signal processing device 112 may comprise a plurality of hardware elements to perform radio frequency conversion. For example, the RF signal processing device 112 may comprise a power amplifier, a mixer, etc.

The baseband signal processing device 111 may further process the baseband signals to obtain information or data transmitted by the peer communications apparatus. The baseband signal processing device 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 113 may control the operations of the baseband signal processing device 111 and the RF signal processing device 112. According to an embodiment of the invention, the processor 113 may also be arranged to execute the program codes of the software module(s) of the corresponding baseband signal processing device 111 and/or the RF signal processing device 112. The program codes accompanied by specific data in a data structure may also be referred to as a processor logic unit or a stack instance when being executed. Therefore, the processor 113 may be regarded as being comprised of a plurality of processor logic units, each for executing one or more specific functions or tasks of the corresponding software module(s).

The memory device 114 may store the software and firmware program codes, system data, user data, etc. of the UE 110. The memory device 114 may be a volatile memory such as a Random Access Memory (RAM); a non-volatile memory such as a flash memory or Read-Only Memory (ROM); a hard disk; or any combination thereof.

According to an embodiment of the invention, the RF signal processing device 112 and the baseband signal processing device 111 may collectively be regarded as a radio module capable of communicating with a wireless network to provide wireless communications services in compliance with a predetermined Radio Access Technology (RAT). Note that, in some embodiments of the invention, the UE 110 may be extended further to comprise more than one antenna and/or more than one radio module, and the invention should not be limited to what is shown in FIG. 2.

In addition, in some embodiments of the invention, the processor 113 may be configured inside of the baseband signal processing device 111, or the UE 110 may comprise another processor configured inside of the baseband signal processing device 111. Thus the invention should not be limited to the architecture shown in FIG. 2.

The service network 120 may comprise a GSM EDGE Radio Access Network (GERAN) 130, a Universal Terrestrial Radio Access Network (UTRAN) 140, an Evolved UTRAN (E-UTRAN) 150, a General Packet Radio Service (GPRS) subsystem 160 and an Evolved Packet Core (EPC) subsystem 170. The GERAN 130, UTRAN 140 and E-UTRAN 150 may be in communication with the GPRS subsystem 160 or the EPC subsystem 170, wherein the GERAN 130, UTRAN 140 and E-UTRAN 150 allow connectivity between the UE 110 and the GPRS subsystem 160 or the EPC subsystem 170 by providing the functionality of wireless transmission and reception to and from the UE 110 for the GPRS subsystem 160 or the EPC subsystem 170, and the GPRS subsystem 160 or the EPC subsystem 170 signals the required operation to the GERAN 130, UTRAN 140 and E-UTRAN 150 for providing wireless services to the UE 110. The GERAN 130, UTRAN 140 and E-UTRAN 150 may contain one or more base stations (or called NodeBs or eNodeBs) and Radio Network Controllers (RNCs). Specifically, the GPRS subsystem 160 includes a Serving GPRS (General Packet Radio Services) Support Node (SGSN) 161 and a Gateway GPRS Support Node (GGSN) 162, wherein the SGSN 161 is the key control node for packet routing and transfer, mobility management (e.g., attach/detach and location management), session management, logical link management, and authentication and charging functions, etc., and the GGSN 162 is responsible for Packet Data Protocol (PDP) address assignments and interoperability with external networks. The EPC subsystem 170 may comprise a Mobility Management Entity (MME) 171, which may be responsible for idle mode UE tracking, paging procedures, and attachment and activation processes. The EPC subsystem 170 may also comprise a Servicing Gateway (SGW) 172, which may be responsible for the routing and forwarding of data packets. The EPC subsystem 170 may also include a Packet data network Gateway (PGW) 173, which may be responsible for providing connectivity from the UE 110 to external networks. Both the SGSN 161 and the MME 171 may be in communication with Home Subscriber Server (HSS) 180 which may provide device identification information, an International Mobile Subscriber Identity (IMSI), etc. It should be appreciated that the EPC subsystem 170 may also comprise a S4-SGSN 175, thereby allowing the GERAN 130 or UTRAN 140 to be accessed when the GPRS subsystem 160 is replaced by the EPC subsystem 170. Additionally, the service network 120 may also include other functional entities, such as a Home Location Register (HLR) (not shown) which is a central database storing user-related and subscription-related information, and the invention is not limited thereto. In an embodiment of the invention, the service network 120 may also comprise a Code Division Multiple Access (CDMA) network.

In an embodiment of the invention, the processor 113 may activate a power-saving mechanism (or an autonomous discontinues reception (AuDRX) mechanism) to stop monitoring a Physical Downlink Control Channel (PDCCH) when the network 120 does not enable a Discontinuous Reception (DRX) mechanism to configure the wireless communication device to switch to a DRX mode or the network disables the DRX mechanism. In an embodiment of the invention, the processor 113 may stop the power-saving mechanism when the network 120 re-enables the DRX mechanism to configure the UE to switch to the DRX mode. That is to say, when the DRX mechanism is activated on the UE 110, the processor 113 will not determine to activate the power-saving mechanism.

In an embodiment of the invention, in the power-saving mechanism the processor 113 may monitor the PDCCH for a first period first. In the first period, the processor 113 may determine whether a down link (DL) assignment (or down link data) from the network 120 is received by the UE 110. When there is not DL assignment during the first period (i.e. the UE 110 does not receive the DL assignment from the network 120 during the first period) the processor 113 will stop monitoring the PDCCH for a second period to save power. That is to say, in the second period, the processor 113 will disable the RF signal processing device 112 to save power until the second period expires. After the second period has expired, the processor 113 will enable the RF signal processing device 112 to monitor the PDCCH for the first period again, and when there is still no DL assignment during the first period, the processor 113 will stop monitoring the PDCCH for the second period accordingly.

In an embodiment of the invention, the first period is defined as a first number of hybrid automatic repeat request round trip times (HARQ RTTs), and the second period is defined as a second number of the HARQ RTTs, wherein one HARQ RTT may comprise multiple subframes (e.g. 8 subframes for the FDD technology). For example, the first number may be set to 1 (i.e. 1 HARQ RTT) and the second number may be set to 2 (i.e. 2 HARQ RTTs), but the invention should not be limited thereto.

Figure 3:
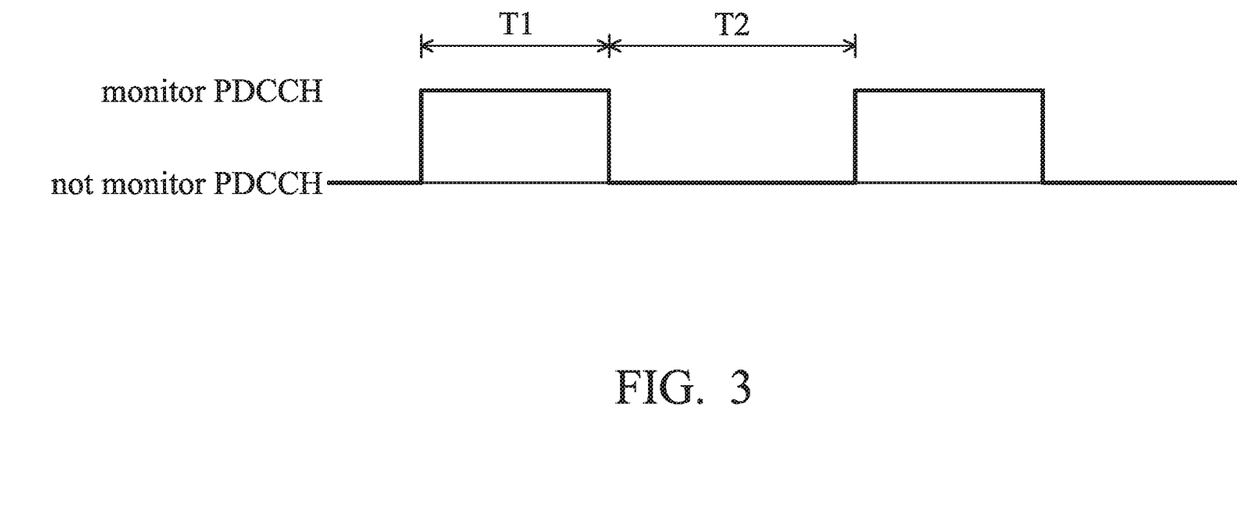
FIG. 3 is a schematic diagram illustrating a first period and a second period in the power-saving mechanism according to an embodiment of the invention.

FIG. 3 is a schematic diagram illustrating a first period and a second period in the power-saving mechanism according to an embodiment of the invention. As shown in FIG. 3, the processor 113 may monitor the PDCCH for a first period T1. When there is no DL assignment during the first period, the processor 113 will stop monitoring the PDCCH for a second period T2 to save power. After the second period T2, the processor 113 will monitor the PDCCH for the first period T1 again, and when there is still no DL assignment during the first period, the processor 113 will stop monitoring the PDCCH for the second period T2 accordingly.

In an embodiment of the invention, when the DL assignment is received during the first period, the processor 113 will extend the first period for a protection period (e.g. 100 ms) from a reception time point of the DL assignment in the first period to ensure that the missed DL assignment in the prior second period can be recovered and the new DL assignment can be received completely by the UE 110. After the protection period has expired, the processor 113 will stop monitoring the PDCCH for the second period. In an embodiment of the invention, the length of the protection period depends on the traffics on the network.

Figure 4:
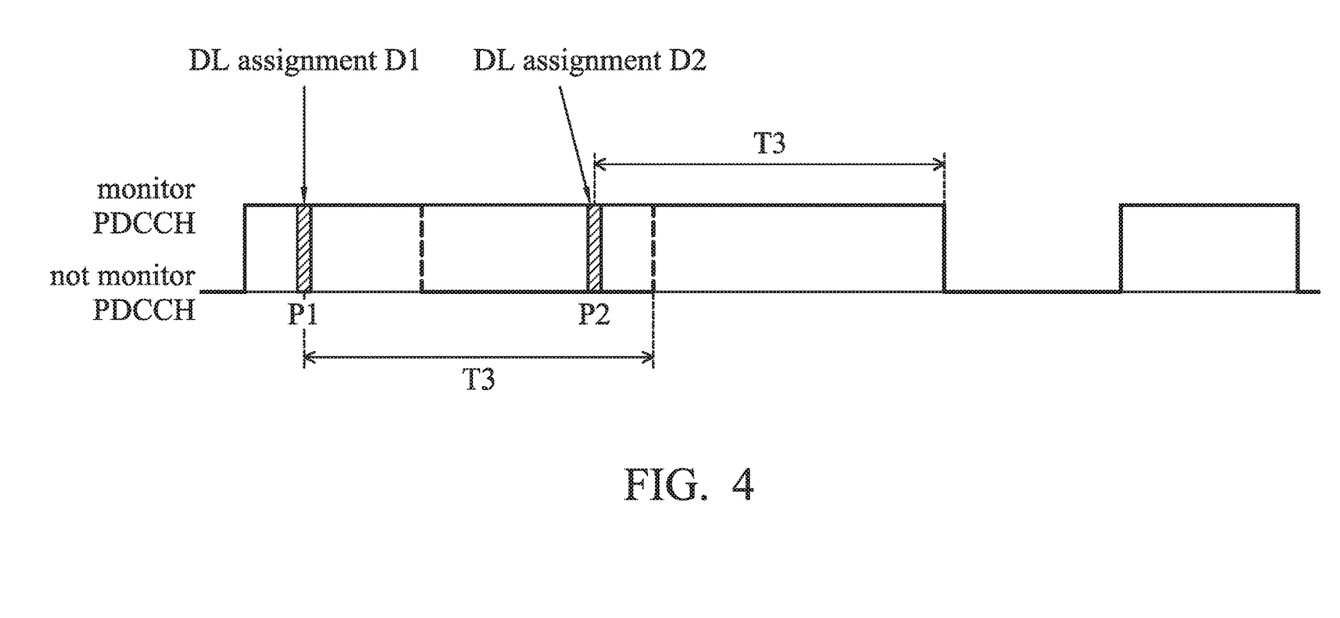
FIG. 4 is a schematic diagram illustrating a period of protection period according to an embodiment of the invention.

FIG. 4 is a schematic diagram illustrating a period of protection period according to an embodiment of the invention. As shown in FIG. 4, when the UE 110 receives a DL assignment D1 in the first period T1, the processor 113 will extend the first period for a protection period T3 (e.g. 100 ms) from a reception time point P1 of the DL assignment D1. Then, the UE 110 receives a DL assignment D2 in the protection period T3 for the DL assignment D1, the processor 113 will extend the protection period T3 corresponding to the DL assignment D1 for the protection period T3 from a reception time point P2 of the DL assignment D2. After the protection period T3 of the DL assignment D2 is expired, the processor 113 will stop monitoring the PDCCH for the second period.

In an embodiment of the invention, in the first period, the processor 113 may further determine whether a predictable DL data will be transmitted to the UE 110 according to a previous measured timing advance (TA) command period, a measurement report triggered by the UE, or a determination for the UE which is inactive for a period of time, but the invention should not be limited thereto. Specifically, the processor 113 may predict that the UE 110 will receive a TA command according to the previous measured timing advance TA command period. The processor 113 may predict that the UE 110 will receive a handover command or other reconfiguration from the network 120, because the measurement report is triggered by the UE 110. The processor 113 may predict that the UE 110 will receive connection receive message (i.e. the connection release may occur), because the UE is inactive for a period of time. Therefore, the processor 113 can determine whether the predictable DL data will be transmitted to the UE 110 according to the events described above. If the processor 113 determines that the predictable DL data will be transmitted to the UE 110, the processor 113 will stop the power-saving mechanism to avoid losing the possible DL data or signaling from the network 120.

Figure 5:
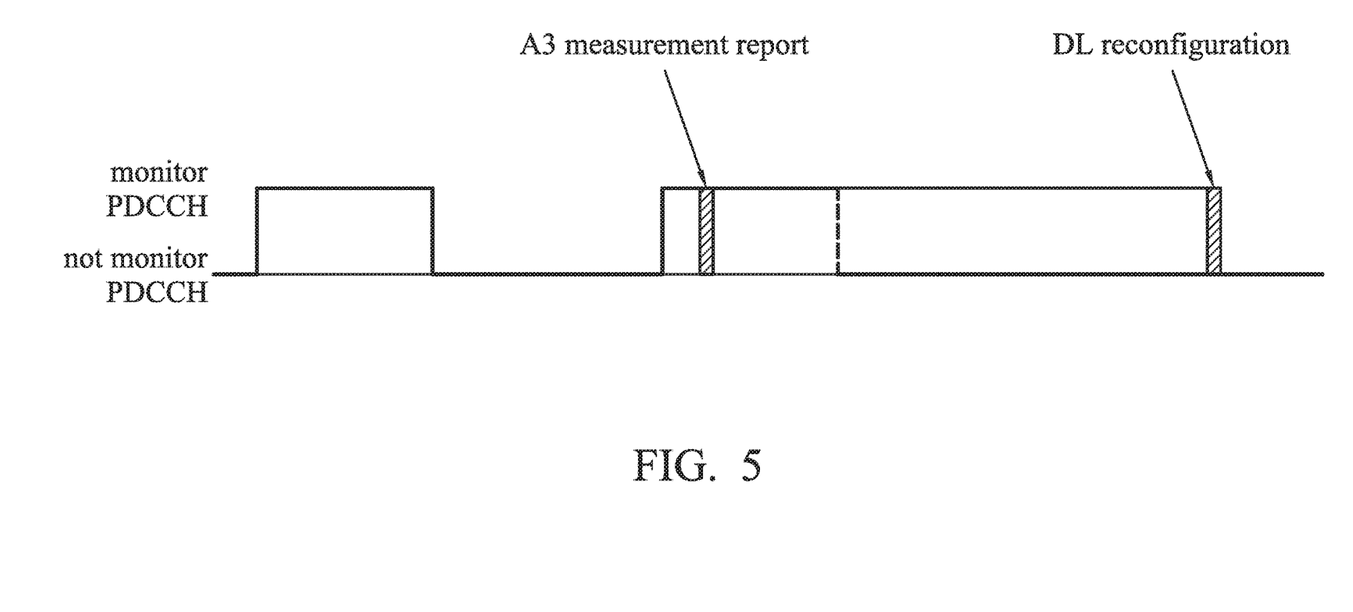
FIG. 5 is a schematic diagram illustrating a predictable DL data according to an embodiment of the invention.

FIG. 5 is a schematic diagram illustrating a predictable DL data according to an embodiment of the invention. As discussing above, taking FIG. 5 for example, when the UE 110 triggers an A3 measurement report for handover, the processor 113 may determine the network 120 will transmit the DL reconfiguration (i.e. handover command) to the UE 110 later. That is to say, the network 120 transmitting the handover command to the UE 110 is predictable because the UE 110 has triggered an A3 measurement report for handover. Therefore, the processor 113 may stop the power-saving mechanism and then monitor the PDCCH for the possible handover command from the network 120 to avoid losing the handover command from the network 120.

In an embodiment of the invention, the processor 113 may determine not to activate the power-saving mechanism when the channel quality of the network 120 is lower than a threshold. This is because when the channel quality of the network 120 is too low, the network may need to re-transmit the data to the UE 110 may times. The processor 113 may continue monitoring the PDCCH without activating the power-saving mechanism.

Figure 6:
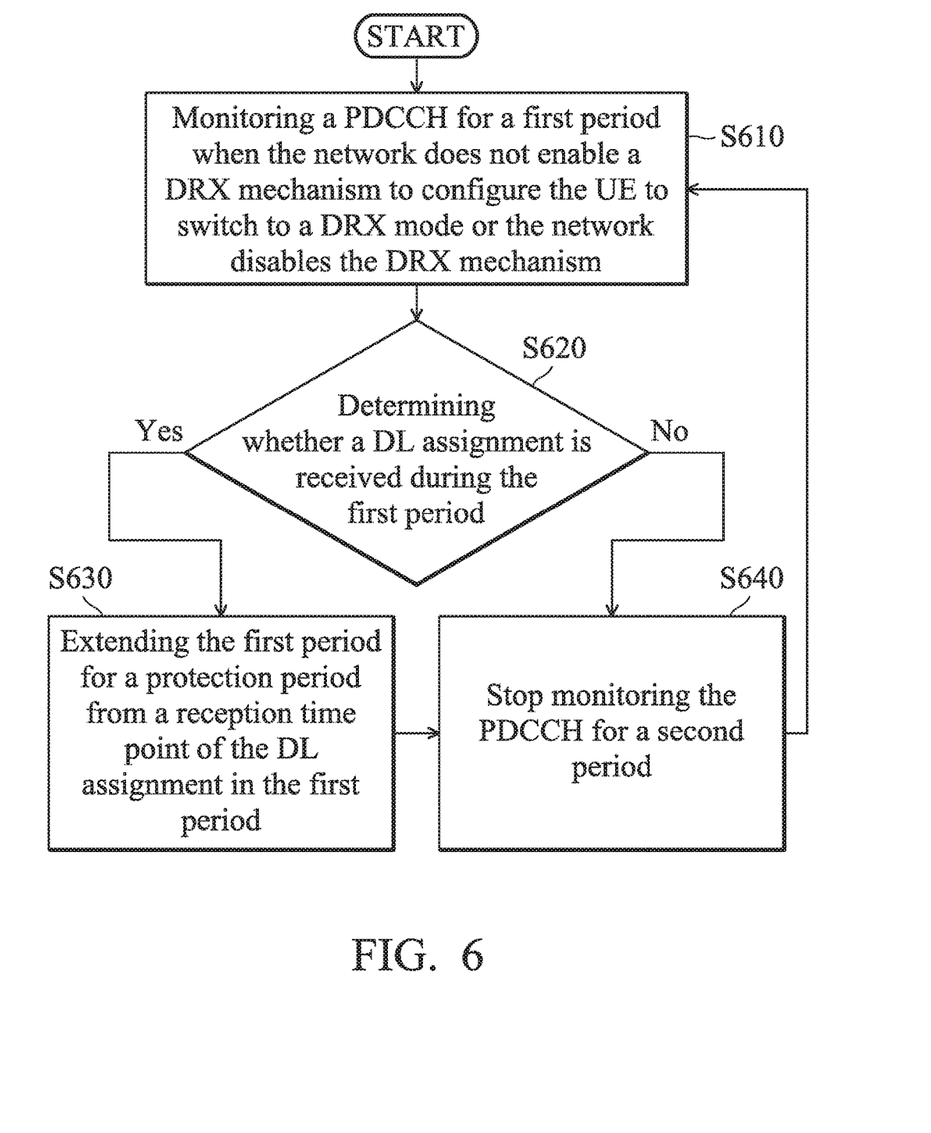
FIG. 6 is a flow chart illustrating the wireless communication method according to an embodiment of the invention.

FIG. 6 is a flow chart illustrating the wireless communication method for the power-saving mechanism according to an embodiment of the invention. The wireless communication method is applied to the UE 110. First, in step S610, the UE 110 monitors a Physical Downlink Control Channel (PDCCH) for a first period when the network 120 does not enable a Discontinuous Reception (DRX) mechanism to configure the UE to switch to a DRX mode or the network disables the DRX mechanism. In step S620, the UE 110 determines whether a DL assignment is received during the first period.

If the DL assignment is received during the first period, step S630 is performed. In step S630, the UE 110 will extend the first period for a protection period from a reception time point of the DL assignment in the first period. If the DL assignment is not received during the first period, step S640 is performed. In step S640, the UE 110 will stop monitoring the PDCCH for a second period. In an embodiment of the invention, the first period is a first number of HARQ RTTs, and the second period is a second number of HARQ RTTs.

When the protection period has expired and there is no other DL assignment, the wireless communication method may perform step S640 to stop monitoring the PDCCH for the second period. When the second period has expired, the wireless communication method returns to step S610.

In some embodiments of the invention, the wireless communication method further comprises the steps of determining whether a predictable DL data will be transmitted to the UE according to a previous measured timing advance (TA) command period, a measurement report triggered by the UE, or a determination for the UE which is inactive for a period of time. When the UE determines the predictable DL data will be transmitted to the UE 110, the UE 110 will stop the power-saving mechanism. In some embodiments of the invention, in the wireless communication method, an uplink resource request is triggered during the first period by the UE 110.

In some embodiments of the invention, the wireless communication method further comprises the steps of the UE 110 stopping the power-saving mechanism when the network 120 re-enables the DRX mechanism to configure the UE 110 to switch to the DRX mode. In some embodiments of the invention, the wireless communication method further comprises the steps of the UE 110 does not activate the power-saving mechanism when channel quality of the network is lower than a threshold.

In the wireless communication method of the invention, when the network does not enable a DRX mechanism to configure the UE to switch to a DRX mode or the network disables the DRX mechanism, the UE can activate a power-saving mechanism to save the power of the UE. In addition, when the network re-enables the DRX mechanism, the UE can stop the power-saving mechanism. Therefore, the wireless communication method of the invention will provide a flexible method to save power of the UE.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A wireless communication method, comprising:
   activating a power-saving mechanism by a user equipment (UE) during a time period that a network does not enable a Discontinuous Reception (DRX) mechanism to configure the UE to switch to a DRX mode or that the network disables the DRX mechanism,
   wherein the power-saving mechanism includes:
   activating reception functionality of the UE during a first time interval to monitor Physical Downlink Control Channel (PDCCH) for receiving a down link (DL) assignment, and
   in a case that no DL assignment is received during the first time interval, deactivating the reception functionality of the UE during a second time interval that starts at an end of the first time interval, the second time interval corresponding to at least one DL assignment reception opportunity via the PDCCH that will be missed by the UE, and
   wherein the method further comprises triggering, by the UE, an uplink resource request during the first time interval.

2. The wireless communication method of claim 1, wherein the first time interval corresponds to a first number of hybrid automatic repeat request round trip times (HARQ RTTs), and the second time interval corresponds to a second number of HARQ RTTs.

3. The wireless communication method of claim 1, wherein the power-saving mechanism further comprises:
in a case that the DL assignment is received during the first time interval, extending the first time interval for a protection period from a reception time point of the DL assignment.

4. The wireless communication method of claim 3, wherein a length of the protection period depends on network traffic.

5. The wireless communication method of claim 1, further comprising:
determining a DL time point at which DL data are to be transmitted to the UE according to a previously measured timing advance (TA) command period, a measurement report triggered by the UE, or a time period that the UE has been inactive.

6. The wireless communication method of claim 5, further comprising:
stopping the power-saving mechanism before the determined DL time point.

7. The wireless communication method of claim 1, further comprising:
stopping the power-saving mechanism when the network re-enables the DRX mechanism to configure the UE to switch to the DRX mode.

8. The wireless communication method of claim 1, further comprising:
determining not activating the power-saving mechanism when channel quality of the network is lower than a threshold.

9. A wireless communication device, comprising:
a radio-frequency (RF) signal processing device; and
a processor, configured to activate a power-saving mechanism during a time period that a network does not enable a Discontinuous Reception (DRX) mechanism to configure the wireless communication device to switch to a DRX mode or that the network disables the DRX mechanism,
wherein the processor, when the power-saving mechanism is activated, is configured to:
activate reception functionality of the RF signal processing device during a first time interval to monitor Physical Downlink Control Channel (PDCCH) for receiving a down link (DL) assignment, and
in a case that no DL assignment is received during the first time interval, deactivate the reception functionality of the RF signal processing device during a second time interval that starts at an end of the first time interval, the second time interval corresponding to at least one DL assignment reception opportunity via the PDCCH that will be missed by the RF signal processing device, and
wherein the processor, when the power-saving mechanism is activated, is further configured to trigger an uplink resource request during the first time interval.

10. The wireless communication device of claim 9, wherein the first time interval corresponds to a first number of hybrid automatic repeat request round trip times (HARQ RTTs), and the second time interval corresponds to a second number of the HARQ RTTs.

11. The wireless communication device of claim 9, wherein the processor, when the power-saving mechanism is activated, is configured to:
in a case that the DL assignment is received during the first time interval, extend the first time interval for a protection period from a reception time point of the DL assignment.

12. The wireless communication device of claim 11, wherein a length of the protection period depends on the network traffic.

13. The wireless communication device of claim 9, wherein the processor, when the power-saving mechanism is activated, is configured to:
determine a DL time point at which DL data are to be transmitted to the wireless communication device according to a previously measured timing advance (TA) command period, a measurement report triggered by the wireless communication device, or a time period that the wireless communication device has been inactive.

14. The wireless communication device of claim 13, wherein the processor, when the power-saving mechanism is activated, is configured to:
stop the power-saving mechanism before the determined DL time point.

15. The wireless communication device of claim 9, wherein the processor, when the power-saving mechanism is activated, is configured to:
stop the power-saving mechanism when the network re-enables the DRX mechanism to configure the UE to switch to the DRX mode.

16. The wireless communication device of claim 9, wherein the processor, when the power-saving mechanism is activated, is configured to:
determine not to activate the power-saving mechanism when channel quality of the network is lower than a threshold.

17. A wireless communication method, comprising:
during a time period that a network does not enable a Discontinuous Reception (DRX) mechanism to configure a user equipment (UE) to switch to a DRX mode or that the network disables the DRX mechanism,
monitoring Physical Downlink Control Channel (PDCCH) without activating a power-saving mechanism when channel quality of the network is lower than a threshold;
activating the power-saving mechanism when the channel quality of the network is not lower than the threshold,
wherein the power-saving mechanism includes:
activating reception functionality of the UE during a first time interval to monitor the PDCCH for receiving a down link (DL) assignment, and
in a case that no DL assignment is received during the first time interval, deactivating the reception functionality of the UE during a second time interval that starts at an end of the first time interval, the second time interval corresponding to at least one DL assignment reception opportunity via the PDCCH that will be missed by the UE; and
triggering, by the UE, an uplink resource request during the first time interval.

18. The wireless communication method of claim 17, wherein the power-saving mechanism further comprises:
in a case that the DL assignment is received during the first time interval, extending the first time interval for a protection period from a reception time point of the DL assignment.

* * * * *